Feb. 27, 1962   F. C. SANDUSKY   3,022,906
METHOD AND MECHANISM FOR HANDLING ARTICLES
Filed Jan. 2, 1958   5 Sheets-Sheet 1
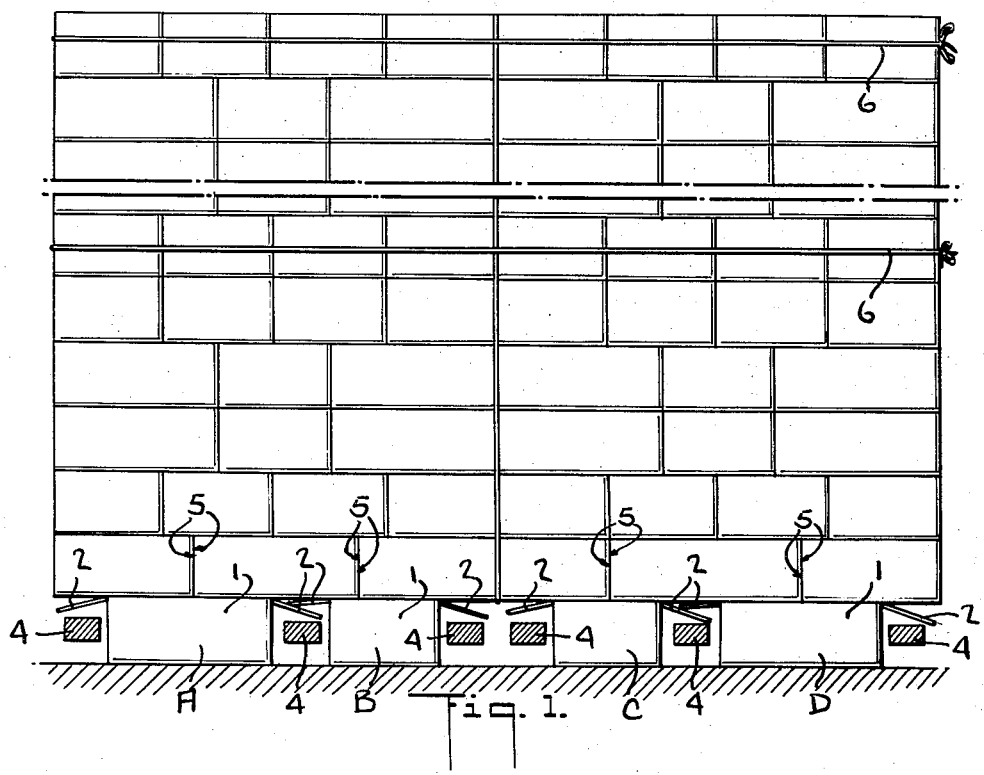
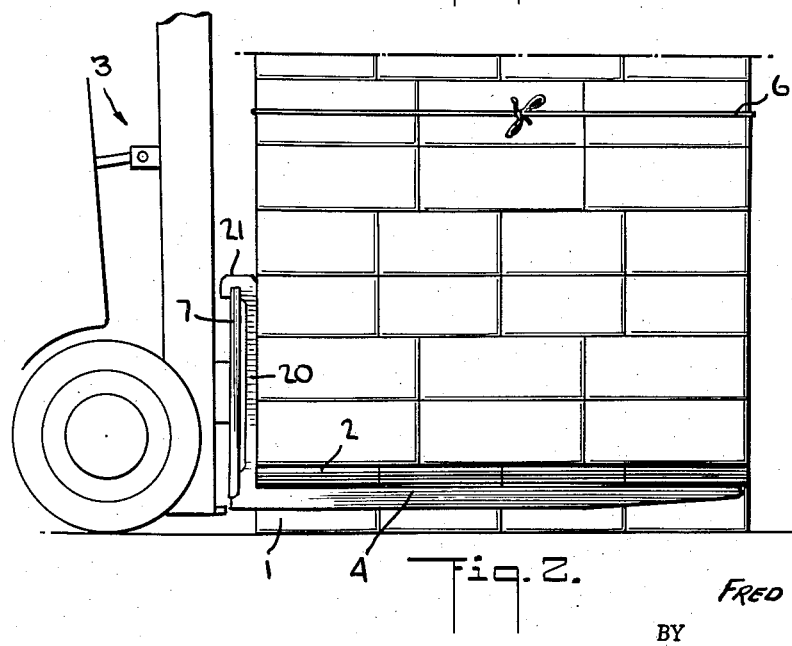
INVENTOR.
FRED C. SANDUSKY
BY
Norman Holland
ATTORNEY

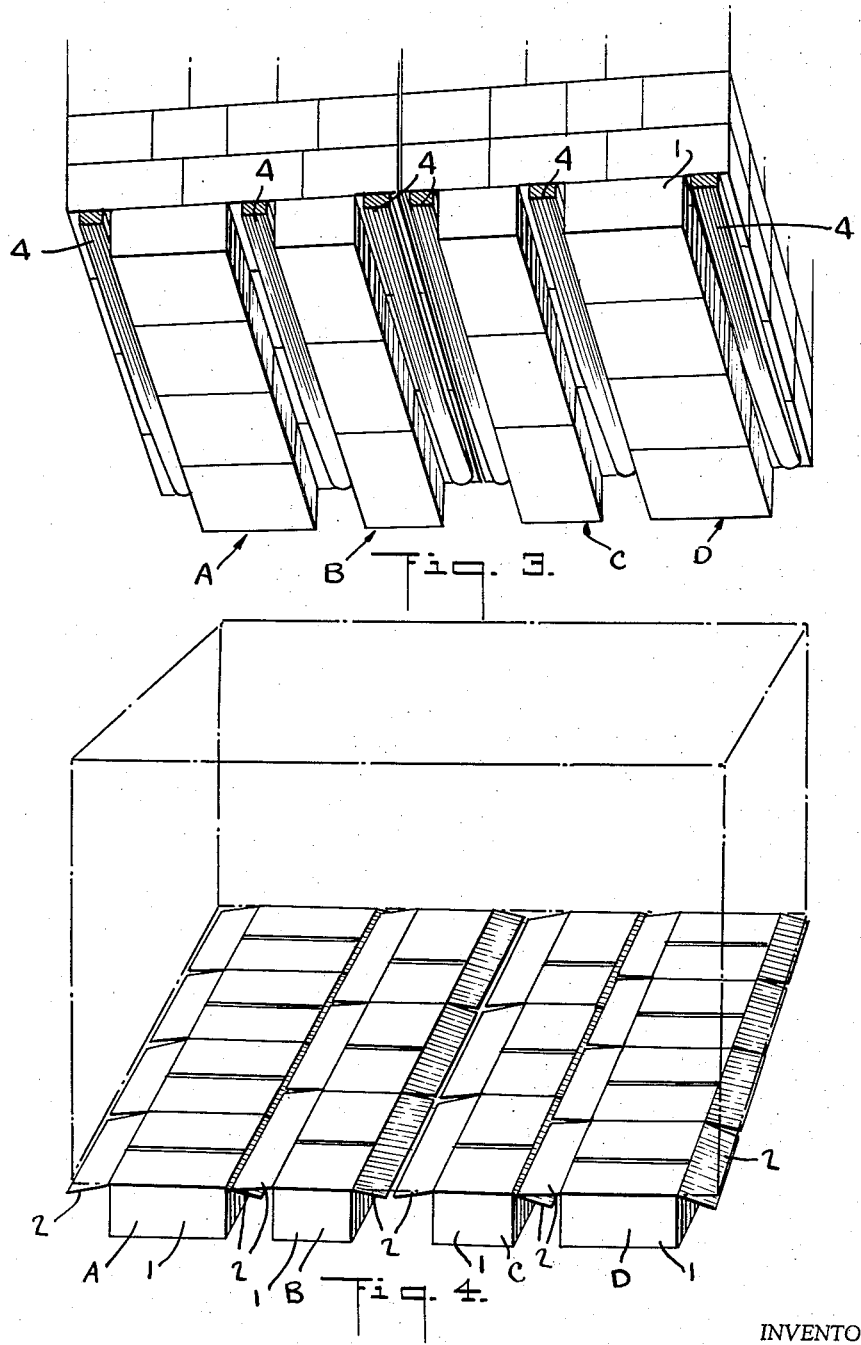

Feb. 27, 1962 F. C. SANDUSKY 3,022,906
METHOD AND MECHANISM FOR HANDLING ARTICLES
Filed Jan. 2, 1958 5 Sheets-Sheet 3
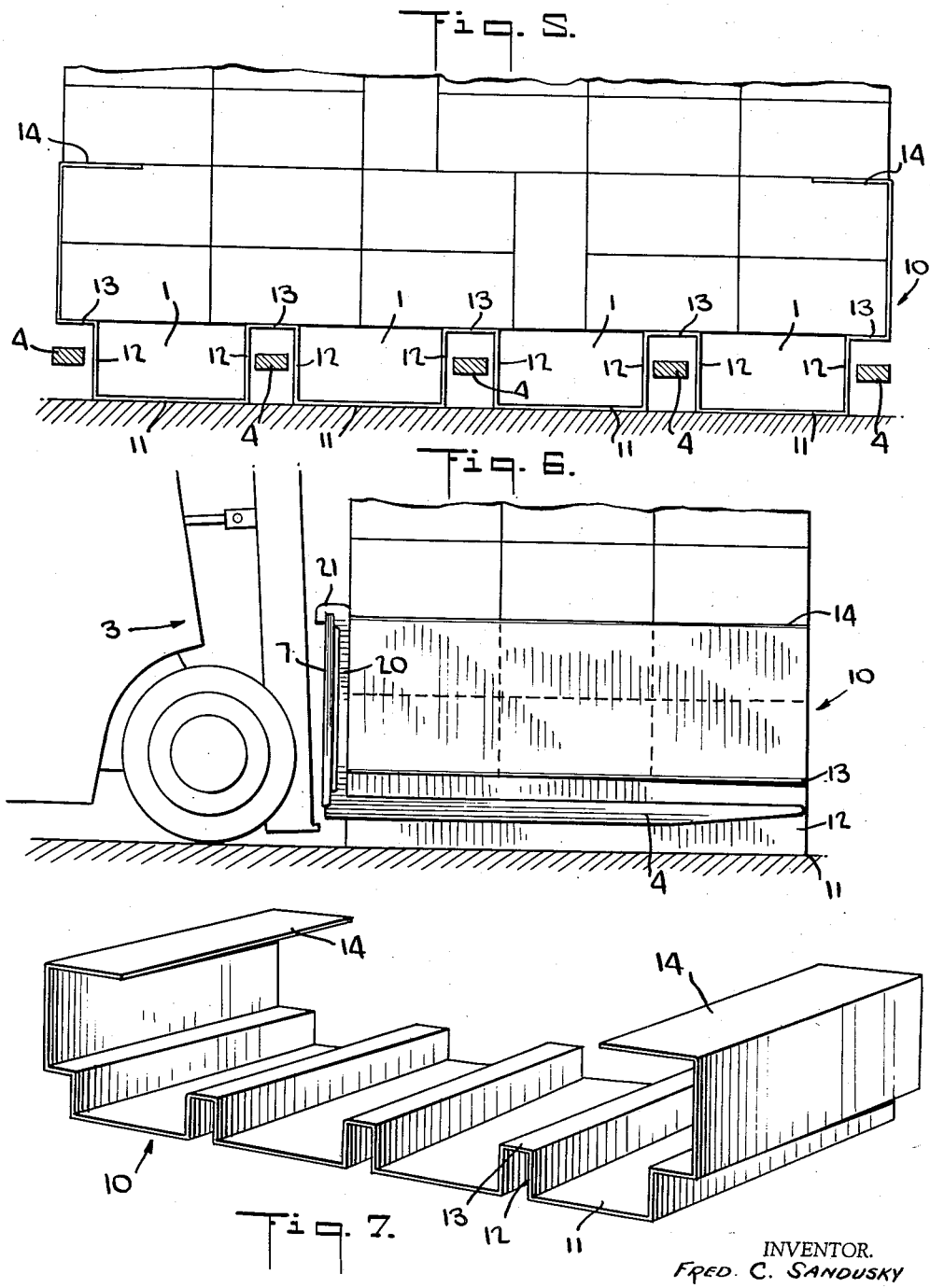
INVENTOR.
FRED. C. SANDUSKY
BY
Norman N. Holland
ATTORNEY

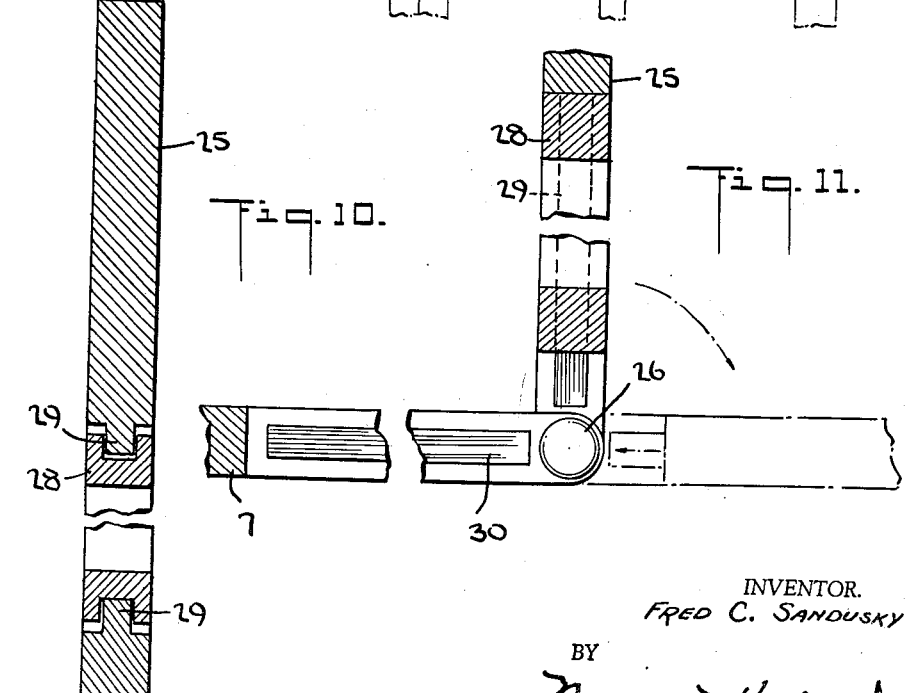

Feb. 27, 1962  F. C. SANDUSKY  3,022,906
METHOD AND MECHANISM FOR HANDLING ARTICLES
Filed Jan. 2, 1958  5 Sheets-Sheet 5
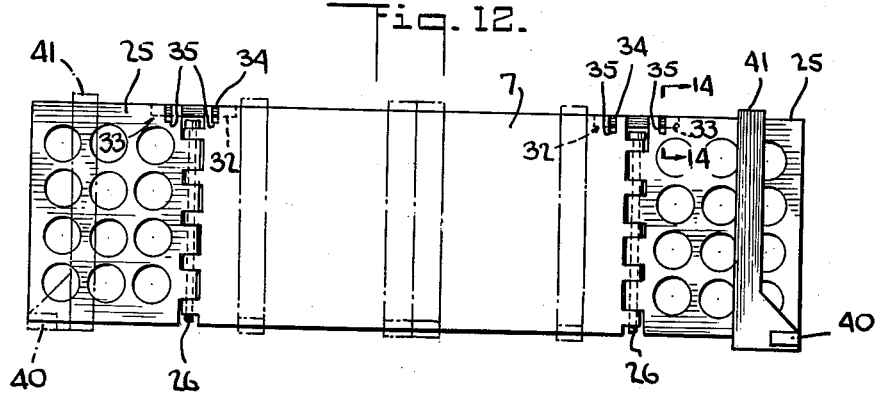
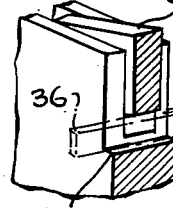
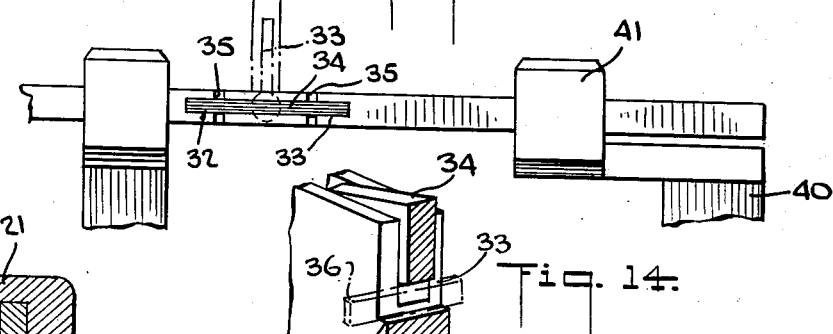
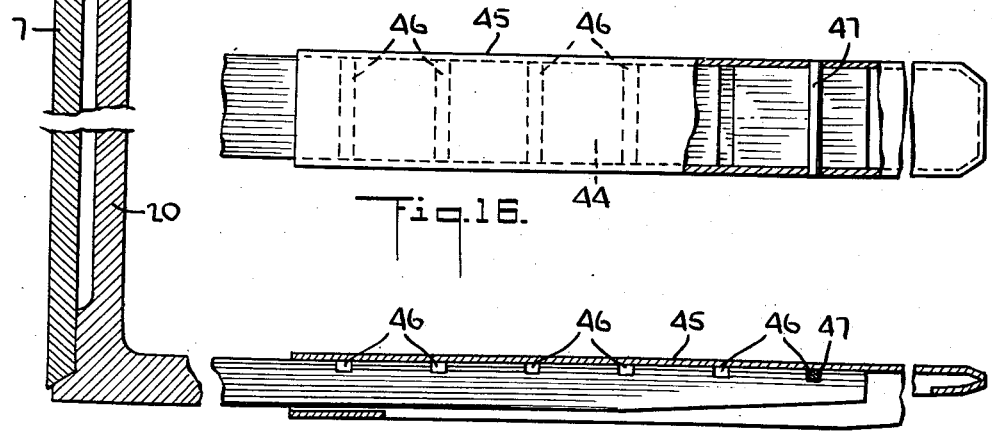
INVENTOR.
FRED C. SANDUSKY
BY
ATTORNEY United States Patent Office
3,022,906
Patented Feb. 27, 1962

3,022,906
METHOD AND MECHANISM FOR HANDLING ARTICLES
Fred C. Sandusky, Salem, N.J., assignor to Anchor Hocking Glass Corporation, Lancaster, Ohio, a corporation of Delaware
Filed Jan. 2, 1958, Ser. No. 706,737
5 Claims. (Cl. 214—10.5)

The present invention relates to the method of handling stacked articles, such as cartons, and more particularly to the method of lifting such cartons by means of a powered lifting fork.

It is common in handling such cartons to stack a number of them on a pallet or skid to form a unit which can be picked up by lifting forks, and carried to and from warehouses, freight cars and the like. Pallets commonly used for this purpose have been made of wood and usually consist of a platform with spacers on the underside so that the fingers of the lifting fork can be inserted beneath the platform in order to lift the stacked cartons. This speeds up the handling of a plurality of cartons since a number of them can be handled as a unit and also facilitates the effective storing of such cartons in warehouses and the loading of them on trucks or freight cars. This type of handling is used extensively by glass container manufacturers who pack the glass containers in cartons and ship the cartons in their open position to the packer who will fill the glass containers.

Since the pallets are usually made of wood, the cost of the pallets or skids which have been used heretofore has been such that they cannot be thrown away after the one use but have to be used indefinitely until worn out. Consequently, the pallets, in addition to a large initial capital investment necessary, have also necessitated the use of storage space which can be a considerable expense when hundreds of such pallets are to be stored.

When stacks are to be shipped by truck or in freight cars, the stack must usually be disassembled and the individual cartons carried manually to the freight car or truck at the point of shipment and at the point of arrival the individual cartons are individually taken off the freight car or truck and reassembled manually on a pallet in a stack. In some instances, in order to eliminate the cost of such manual handling, the stacks of cartons are shipped with the pallets and the receiver of the cartons sends the pallets back to the shipper. In either case the shipping costs are high.

The lifting fork usually comprises a powered fork lift truck having a series of horizontal members, referred to as fingers herein, which can be lowered close to the ground and moved beneath the pallet. The fingers can be lifted and lowered with the stack of cartons on them to thereby permit transfer of the cartons to and from storage and to and from a truck or freight car in units without disturbing the relative positions or arrangement of the cartons in the stack.

Ordinarily such fork fingers are permanently mounted on the fork lift truck on a bar or plate in front of the truck. In some cases the fingers have been removably mounted on the front plate of the fork lift truck. However, fork lifts of this type can handle stacks only of a width approximately equal to the width of the fork lift truck. Also, such trucks have been able to handle stacks whose depth was no greater than the length of the fork fingers. Consequently, when a large number of cartons are to be handled, it has been the custom to separate the cartons into two or more stacks and to lift each stack, separately. This obviously wastes time and labor and necessitates the use of more pallets and fork lift trucks.

The present invention overcomes these defects and has for one of its objects a method of lifting cartons which will eliminate the use of the ordinary wooden pallet.

Another object of the present invention is a method of lifting a stack of cartons by using a pallet which can be collapsed and easily stored until re-use without necessitating the use of large storage spaces.

Another object of the present invention is a method of handling a stack of cartons which virtually eliminates the necessity for manually handling individual cartons when shipped.

Another object of the present invention is to provide a fork lift truck which can lift stacks of cartons of varying size.

A further object of the present invention is to provide a fork lift truck having improved means for lengthening the fork fingers to permit it to lift stacks of varying widths.

Another object of the present invention is to provide an improved method and means for lifting stacks of cartons which is simple, expeditious and inexpensive.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 shows a front elevational view of a stack of cartons showing the fork fingers in position to lift the stack in accordance with the method of the present invention;

FIG. 2 is a side elevational view of the stack shown in FIG. 1 showing the position of the fork lift before the lifting operation occurs;

FIG. 3 is a perspective bottom view of the stack shown in FIG. 1 showing the relationship of the fork fingers to the lowermost layer of cartons when the stack is lifted;

FIG. 4 is a perspective view showing the relative positions of the flaps of the lowermost cartons prior to the insertion of the fork fingers between the cartons;

FIG. 5 is a front elevational view showing the position of the fork fingers to lift the stack by a modified method of lifting the stack of cartons;

FIG. 6 is a side elevational view of the stack shown in FIG. 5 showing the position of the fork lift according to the modified method;

FIG. 7 is a perspective view of a disposable pallet to be used with the modified method of lifting stacks shown in FIG. 5;

FIG. 8 is a front elevational view of the front plate of a fork lift having side wings for permitting the fork lift to accommodate stacks of varying widths.

FIG. 9 is a top elevational view of the front plate shown in FIG. 8 showing the relative positions of the side wings when in use and when not in use;

FIG. 10 is an enlarged side sectional view taken on line 10—10 of FIG. 8 showing a locking means for the side wings;

FIG. 11 is an enlarged top sectional view showing the hinge mounting for the side wings;

FIG. 12 is a front elevational view of the fork lift front plate showing a modified form of locking device for the side wings;

FIG. 13 is an enlarged top elevational view of the modified locking device;

FIG. 14 is a perspective sectional view taken along line 14—14 of FIG. 12 showing the position of the modified locking means when being unlocked;

FIG. 15 is a side sectional view of a fork finger showing the improved means for adjusting the length of the fork finger; and FIG. 16 is a top elevational view, partly in section, showing the locking means.

Referring to FIGS. 1 and 2, the method of the present invention generally comprises stacking a plurality of cartons on each other into a unit with the lowermost layer of cartons 1 spaced from each other in rows with flaps 2 extending outwardly. Fork fingers 4 of a fork lift 3 are passed between the spaced rows of bottom cartons so that they underlie the flaps 2. When the fork fingers 4 are lifted by the fork lift 3, the fingers 4 press the flaps 2 against the next higher layer of cartons to thereby lift the stack.

The invention will now be described in detail with reference to FIGS. 1 to 4 of the drawings which show the improved method of lifting a stack of cartons. The stack is comprised of a plurality of cartons having flaps 2. According to the present invention the flaps 2 of the bottom layer of cartons are bent outwardly and the bottom cartons 1 are arranged in spaced rows.

In the drawings four rows of bottom cartons have been illustrated and have been marked A, B, C and D for convenience. It will be understood, of course, that any number of rows of cartons can be used, as may be desired. It will be noted from FIGS. 1 and 4 that the flaps 2 between rows A and B and the flaps 2 between rows C and D overlie each other whereas the flaps 2 between rows B and C do not overlie each other. With this arrangement a single fork finger 4 may be used between rows A and B and between rows C and D to underlie each pair of overlying flaps 2 whereas two adjacent fork fingers 4 are used between rows B and C to underlie each flap 2 so that more lifting power can be applied to the center of the stacks where the weight is concentrated than to the edges of the stack, as will be more fully described hereinafter.

Additional layers of cartons 1 are stacked on top of the bottom layers of cartons so that the second layers of cartons 1 may straddle the space between the bottom rows of cartons with the ends 5 (FIG. 1) of the second layer of cartons 1 resting on the bottom rows of cartons approximately at the mid-point thereof. When the stack is completed, it may be held together by tying the cord 6 around it (FIG. 1).

The fork fingers 4 of the fork lift 3 are inserted between the spaced bottom rows of cartons underneath the flaps 2. When the fork fingers 4 are lifted by the fork lift 3 the fingers 4 will press the flaps 2 against the second layer of cartons to thereby grip the flaps between the fingers 4 and the second layer of cartons 1. Further lifting of the fingers 4 will lift the whole stack as shown in FIG. 3. The grip on the flaps 2 exerted between the fingers 4 and the second layer of cartons 1 is sufficient to lift not only the bottom row of cartons but also the stack of cartons which is supported by the bottom rows.

Since there is a greater amount of weight at the center of the stack than at the ends of the stack, it is preferred that the bottom rows B and C are so spaced that their flaps do not overlie each other but lie adjacent to each other to permit two fingers 4 to be inserted between the rows B and C to sustain the greater weight at the center of the stack. It will be understood, of course, that if desired, the spacing between the two rows B and C may be smaller so that their flaps 2 overlie each other to require a single finger 4.

The stack can then be transported by the fork lift to a truck, a storage warehouse, or a freight car and deposited on the floor thereof by merely lowering the fork fingers and withdrawing them from between the spaced rows. The stack can stand where deposited until it is to be transferred again, at which time the fork lift can repeat the above operation without the necessity of re-stacking the cartons.

With this arrangement the stack of cartons may be lifted by the fork lift without the use of a pallet. Hence, the stack may be transferred from the floor to a truck or freight car any number of times without the necessity of using a pallet and without the necessity of disassembling the stack of cartons thereby virtually eliminating manual handling of individual cartons when shipped.

Where it is desired to lift a stack of cartons which do not have flaps or in which the flaps are too short to be effectively grasped by the fork lift fork fingers, the modified method illustrated in FIGS. 5 and 7 may be used. A paperboard sheet 10 is wrapped around the spaced bottom layer of cartons 1 so that a portion of it underlies the bottom of the spaced cartons as shown at 11, vertical portions of the sheet lie along the sides of the cartons as shown at 12, and portions 13 bridge the space between the cartons. In other words the sheet 10 is made to fit the contours of the bottom layer of spaced cartons. The ends 14 of the paperboard sheet are tucked between the upper layers of the cartons to permit the stack to be held together as a unit. The fork fingers 4 are then inserted in the space between the bottom rows of cartons and when the fork lift lifts the fingers 4 the fingers will abut the portion 13 of the paperboard sheet which bridges the space between the bottom rows of cartons and thereby lifts the stack. The portion 14 tucked in between upper layers of cartons prevents the stack from coming apart when lifted.

It will be seen that with this method, the paperboard sheet 10 can be discarded after use without any great expense. If desired, the sheet can be easily folded and stored for further use without requiring a large amount of storage space.

While the method described above can be used with any type of fork lift having fork fingers, it is preferred that fork fingers of the fork lift are removably mounted on the ork lift so that the number of fingers used can be varied and the spacing between the fingers can be adjusted. These removably mounted fork fingers 4 are illustrated in FIGS. 2, 6 and 15.

The fingers 4 have a vertical portion 20 integral therewith which forms a hook 21 at its upper end so that the finger can be hooked onto a front plate 7 of the fork lift 3. Each finger 4 can be independently removed from the front plate 7 and the spacing between the fingers 4 can be adjusted as desired.

With this arrangement, when the carton stack shown in FIGS. 1 and 5 is of such a nature as to require additional rows of cartons on the bottom layer, additional fork fingers can be mounted on the fork lift to be inserted between the additional spaces created by the additional rows of lowermost cartons. Also, where it is desired to alter the spacing between the bottom layer of cartons, the space between the fork fingers can be correspondingly adjusted.

In order to permit the fork lift to lift stacks of varying width, the front plate 7 of the fork lift is provided with a pair of side wing extensions 25 as shown in FIGS. 8 to 11. The side wings 25 are pivotally mounted on the plate 7 by means of hinge 26 so that the side wings 25 can normally lie along the sides of the fork lift 3 when not needed and when they are to be used they can be swung out and placed into alignment with the plate 7. Additional fork fingers can be hung on the side wings 25 so that stacks of greater width can be lifted. The side wings 25 are provided with a plurality of openings 27 therein to lighten their weight.

In order to lock the side wings 25 in their operative aligned position, a clip 28 is mounted on each side wing 25 which is slidable along a pair of tracks 29 formed in the side wings 25 (FIGS. 8 and 9) onto coextensive tracks 30 formed in an opening in the front plate of the fork lift (FIG. 8). When the side wings 25 are not to be used, they are folded back along the sides of the fork lift. To unlock the side wings from the aligned position, the clips 28 are slid outwardly away from the center of the plate 7 until their edges are past the hinges 26 and the clips entirely on the side wings, as shown in the right hand side of FIG. 8. The side wings can then be folded back along the sides of the fork lift 3 when the fork lift is to lift normal stacks. When the fork lift 3 is to lift wider stacks the side wings 25 are placed in alignment with front plate 7 and are locked in position by sliding the clips 28 inwardly toward the center of front plate 7 so that a portion of the clip will be on the plate 7 and the other portion of the clip will be on the side wing 25 as shown in the left hand side of FIG. 8, to thereby lock the side wings in place.

A modified form of locking means, for the side wings 25, is shown in FIGS. 12 to 14. In this case, the top edges of the side wings 25 and the front plate 7 are provided with coextensive longitudinal slots 32 and 33 which are adapted to accommodate a flat, elongated pin 34 to lock the side wings 25 and the front plate 7 in aligned position, as shown in FIGS. 12 and 13. A pair of transverse slots 35 are provided on the longitudinal slots 32 and 33 which are slightly deeper than the longitudinal slots 32 and 33 to permit an instrument 36 to be inserted beneath the pin 34 to lift the pin and permit its removal, as shown in FIG. 14.

In order to prevent the fork fingers 40 (FIGS. 12 and 13) located at the end edges of the front plate 7 from damaging any equipment when the stacks are in a narrow trailer, the vertical fork portions 41 of these fingers are offset inwardly so that they will not strike the sides of the trailer to damage it. This offsetting will also prevent the end fingers from falling off due to slight jars or bumps.

In order to permit the fingers to lift stacks which are of greater depth, FIGS. 15 and 16 shown the use of fork fingers which are adjustable lengthwise. The horizontal fork finger 44 has an outside sleeve 45 telescopically slidable thereon to lengthen the fingers. In order to lock the sleeve in its desired position, the fork finger 44 is preferably provided with a plurality of transverse slots 46 and the outside sleeve is provided with a transverse pin 47 adapted to enter the slots 46. When the fork finger is to be lengthened, the outside sleeve 45 is lifted so as to lift the pin 47 from the slot 46 and the sleeve is moved outwardly to the desired length. When the necessary length is reached, the outside sleeve 45 is lowered so that its locking pin 47 enters a slot 46 to lock the sleeve 45 in position.

It will be seen from the above that the present invention provides an improved method of lifting a stack of cartons which eliminates the use of the ordinary pallet, virtually eliminates manual handling of the individual cartons when shipped, and which provides an easily disposable pallet, if desired. The invention also provides improved fork lift mechanism to permit a fork lift truck to lift stacks of varying widths and lengths.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of lifting a stack of articles having flaps which comprises spacing the bottom layer of articles with their flaps extending into the space between the bottom layer of articles, stacking the articles on each other in layers, introducing lifting means in the space between the bottom layer of articles beneath said flaps, and exerting a lifting force to said lifting means to lift said stack of articles.

2. The method of lifting a stack of articles having top flaps which comprises arranging a bottom layer of articles in spaced rows, bending the top flaps of articles outwardly into the space between the rows of articles, arranging additional layers of articles above said bottom rows of articles to form a stack, introducing lifting means in the space between the bottom rows of articles beneath said flaps to bear against the outwardly bent flaps, and exerting a lifting force on said lifting means to lift said stack.

3. The method of lifting a stack of articles having top closing flaps which comprises arranging a bottom layer of articels in spaced rows, bending the top flaps of said bottom rows of articles outwardly into the space between the rows, stacking additional layers of articles above said bottom layer of articles so that the outwardly bent flaps will bear against the underside of said additional articles, introducing a lifting element into the space between the rows of articles; and exerting a lifting force to said lifting element so that it bears against the underside of the flaps and presses them against the underside of the additional articles to thereby lift the stack.

4. The method of lifting a stack of cartons having top closing flaps which comprises arranging a bottom layer of cartons in spaced rows, bending the flaps of the bottom layer of cartons outwardly into the space between the rows so that the flaps of adjacent articles overlie each other, arranging upper layers of cartons above said spaced bottom layer to form a stack, the first layer of cartons above the bottom layer being arranged so that the edge of each carton rests on top of the bottom cartons and the center of said second layer of cartons overlie the space between the bottom cartons to permit the outwardly extending flaps of the bottom cartons to bear against the bottom of the second layer of cartons, inserting fork lift fingers in the spaces between the rows of the bottom layer of cartons, and lifting said fork fingers so as to bear against the flaps and press them against the underside of the second layer of cartons to thereby grip the flaps and lift the stack.

5. A stack of cartons having flaps comprising a plurality of cartons stacked on each other in layers, the bottom layer of cartons being arranged in spaced rows, the flaps of said bottom layer of cartons being bent outwardly into the space between the rows of articles, whereby lifting means can be inserted between the spaced rows to permit the stack to be lifted.

References Cited in the file of this patent

UNITED STATES PATENTS

| 1,900,756 | Butts | Mar. 7, 1933 |
| 1,922,560 | Sullivan | Aug. 15, 1933 |
| 2,061,495 | Woodruff | Nov. 17, 1936 |
| 2,103,649 | Sullivan | Dec. 28, 1937 |
| 2,489,054 | Sprolle | Nov. 22, 1949 |
| 2,702,140 | Momyer | Feb. 15, 1955 |
| 2,702,642 | Bensinger | Feb. 22, 1955 |
| 2,770,381 | Hegarty | Nov. 13, 1956 |
| 2,774,490 | Strong | Dec. 18, 1956 |
| 2,896,798 | Celley | July 28, 1959 |

FOREIGN PATENTS

| 883,269 | Germany | July 16, 1953 |
| 907,758 | Germany | Mar. 29, 1954 |
| 765,992 | Great Britain | Jan. 16, 1957 |